United States Patent

Ekbergh et al.

[15] 3,673,338

[45] June 27, 1972

[54] BI-DIRECTIONAL TRANSLATOR CIRCUIT

[72] Inventors: Evert Oskar Ekbergh, Dr. Widerstroms gata 70, Hagersten; Per Gustaf Jonsson, Sorlid, Ronninge, both of Sweden

[22] Filed: Aug. 1, 1969

[21] Appl. No.: 51,027

[30] Foreign Application Priority Data

Aug. 1, 1968 Great Britain ......................36,736/68

[52] U.S. Cl. ..........................................179/18 ET
[51] Int. Cl. ..........................................H04q 3/47
[58] Field of Search ..................................179/18 ET, 18 FH

[56] References Cited

UNITED STATES PATENTS

| | | | |
|---|---|---|---|
| 3,235,664 | 2/1966 | Muroga et al. | 179/18 ET |
| 2,912,511 | 11/1959 | McKim | 179/18 ET |
| 3,312,785 | 4/1967 | Fujinaka | 179/18 ET |

FOREIGN PATENTS OR APPLICATIONS

| | | | |
|---|---|---|---|
| 270,230 | 8/1964 | Australia | 179/18 ET |

*Primary Examiner*—Kathleen H. Claffy
*Assistant Examiner*—Thomas W. Brown
*Attorney*—C. Cornell Remsen, Jr., Walter J. Baum, Percy P. Lantzy, J. Warren Whitesel, Delbert P. Warner and James B. Raden This patent filed under rule 47a.

[57] ABSTRACT

A bi-directional relay translator is provided which responds to a local call for translating the equipment number of a calling line to the directory number of that line and which responds to a terminating call for translating the directory number of the called line to the equipment number of that line. The translation of an outgoing call is initiated by operation of the calling line relay which provides an equipment number identification, following which a translation to decimal directory number is effected. In the reverse direction, when a directory number is registered, completion of the registration initiates a translation of the decimal directory number to an equipment number.

4 Claims, 4 Drawing Figures

BI-DIRECTIONAL TRANSLATOR CIRCUIT

Figure 1:
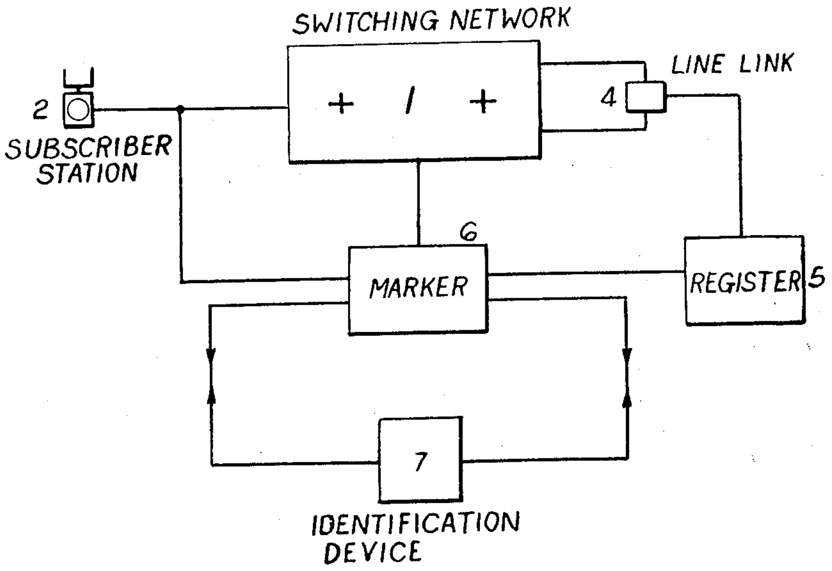

The present invention relates to a bi-directional translation arrangement for use in a telecommunication exchange for effecting translations in either direction between the equipment numbers and the directory numbers of the lines connected to the exchange.

The director number (DN) for a subscriber's line is the number by which he is identified to the "outside world" and which is printed in the telephone directory. When a call is to be set up, the caller transmits from his station to the exchange the directory number of the wanted line. The equipment number (EN) for a subscriber's line is a number which represents the physical location within the exchange at which that subscriber's line is connected. It will be appreciated that a subscriber's equipment number can be altered if this is desirable for convenience of operation without altering his directory number. This is done readily by altering the connections within the exchange at one or more distribution frames, in well-known manner.

Where the exchange is a common control system, a calling line is first identified to the exchange by its equipment number, but for such purposes as metering it is necessary to be able to derive from the caller's equipment number his directory number. Again, when the wanted lines number is received it is received in the form of a directory number and it is necessary to derive therefrom the equipment number for call control purposes. Thus translation in both directions, i.e. EN–DN and DN–EN, is required.

It is an object of the present invention to provide a simple and inexpensive bi-directional translation arrangement for a telecommunication exchange.

According to the present invention there is provided a telephone network identification circuit enabling a fast identification in a marker of a calling subscriber's number on the basis of equipment numbers, which equipment numbers have been recorded by the marker, which comprises an identification device connected to the marker by means of which device leads intended for the various subscriber equipment numbers and connected to the marker are connected to leads intended for corresponding subscriber directory number and also connected to the marker, said circuit also being utilisable for identification of subscriber equipment numbers of called subscribers when the corresponding subscriber directory numbers are known by the marker, the circuit thus being reversible.

According to the present invention there is provided a bi-directional translation arrangement for use in an automatic telecommunication exchange, which includes inputs from each subscriber's line served by the arrangement, one of which inputs is marked when a call is initiated at its one of said lines, a number of first selection devices arranged in groups, connections to said devices whereby when one of said inputs is marked a combination of said selection devices including at least one device in each said group is operated, which combination identifies the equipment number of the line whose input is marked, means responsive to the operation of a combination of said selection devices identifying a calling line's equipment number to signal to the equipment associated with that line that said operation has occurred, a distribution frame with first terminals each corresponding to an equipment number and second terminals each corresponding to a directory number and jumpers each interconnecting an equipment number terminal and a directory number terminal, a connection to said frame from each line served by the arrangement on which a marking appears as a result of said transmission to that line of a signal after said operation of the first selection devices has occurred, which marking is applied to the calling line's first terminal of said frame and therefrom via said frame to the line's second terminal, a second set of selection devices arranged in groups and so controlled from the second terminals of said frame that when a marking appears on one of said second terminals a combination of said second selection devices identifying the calling lines directory number is operated, which combination includes at least one second selection device in each of the groups thereof, so that in the case of a calling line its equipment number is registered in said first selection devices whereafter its directory number is recorded in said second selection devices, a further set of inputs over which, when a terminating call to one of the lines served by the arrangement is to be set up the combination of said second selection devices which identifies that line's directory number is operated, means under control of said second selection devices and responsive to the operation of a combination thereof to mark the second terminal of said frame for the wanted line's directory number, so that said marking is transmitted to the first terminal of said frame for that line's equipment number, connections from said first terminals to said first selection devices whereby when a marking is passed to a line's first terminal of said frame from that line's second terminal, a combination of said first selection devices which identify the wanted line is operated, means responsive to the operation of a combination at said first selection devices whereby in the case of a terminating call both the wanted line's directory number and its equipment number are registered, which identifies a lines equipment number to send that number to any other equipment which needs it, and means responsive to the operation of a combination of said second selection devices which identifies a line's directory number to send that number to any other equipment which needs it.

Figure 2:
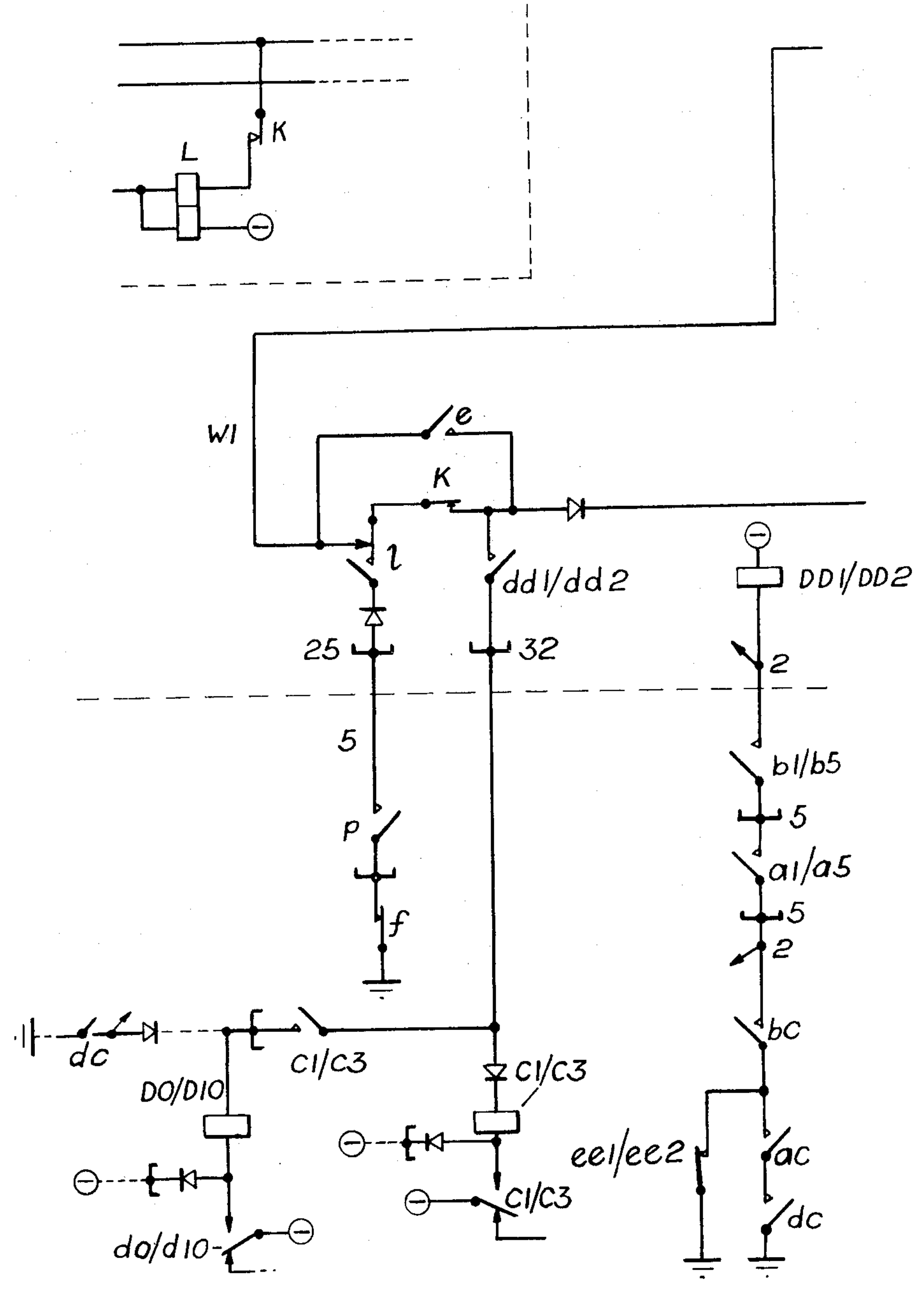
Figure 3:
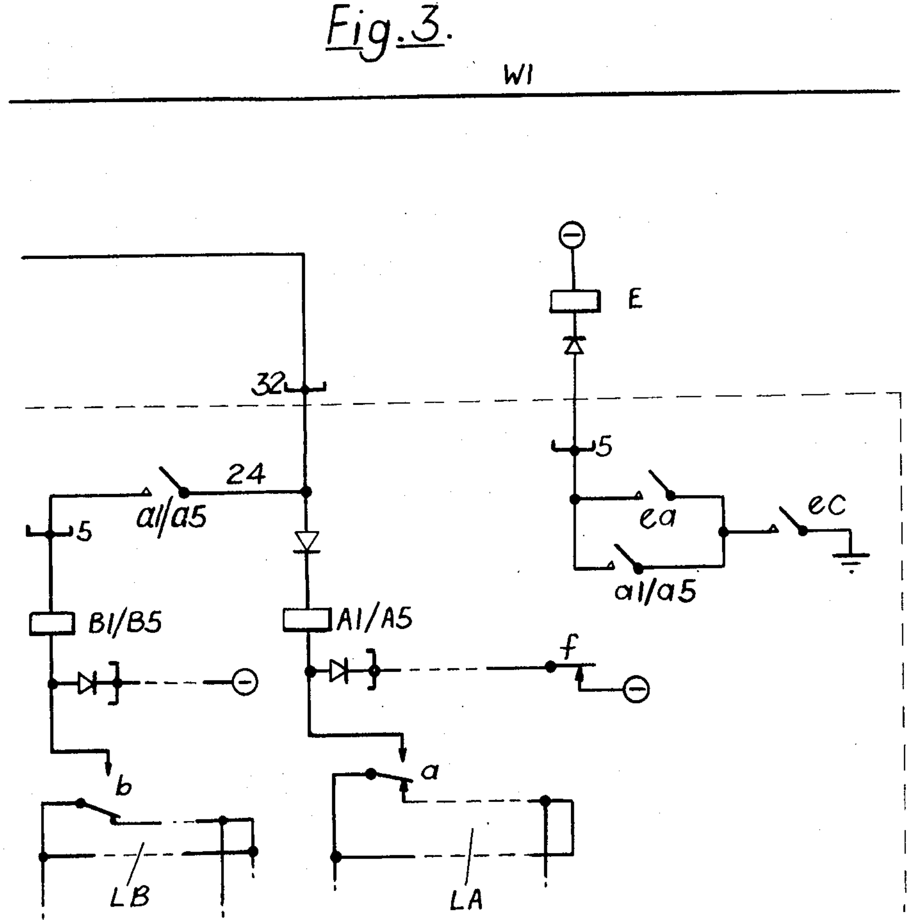
Figure 4:
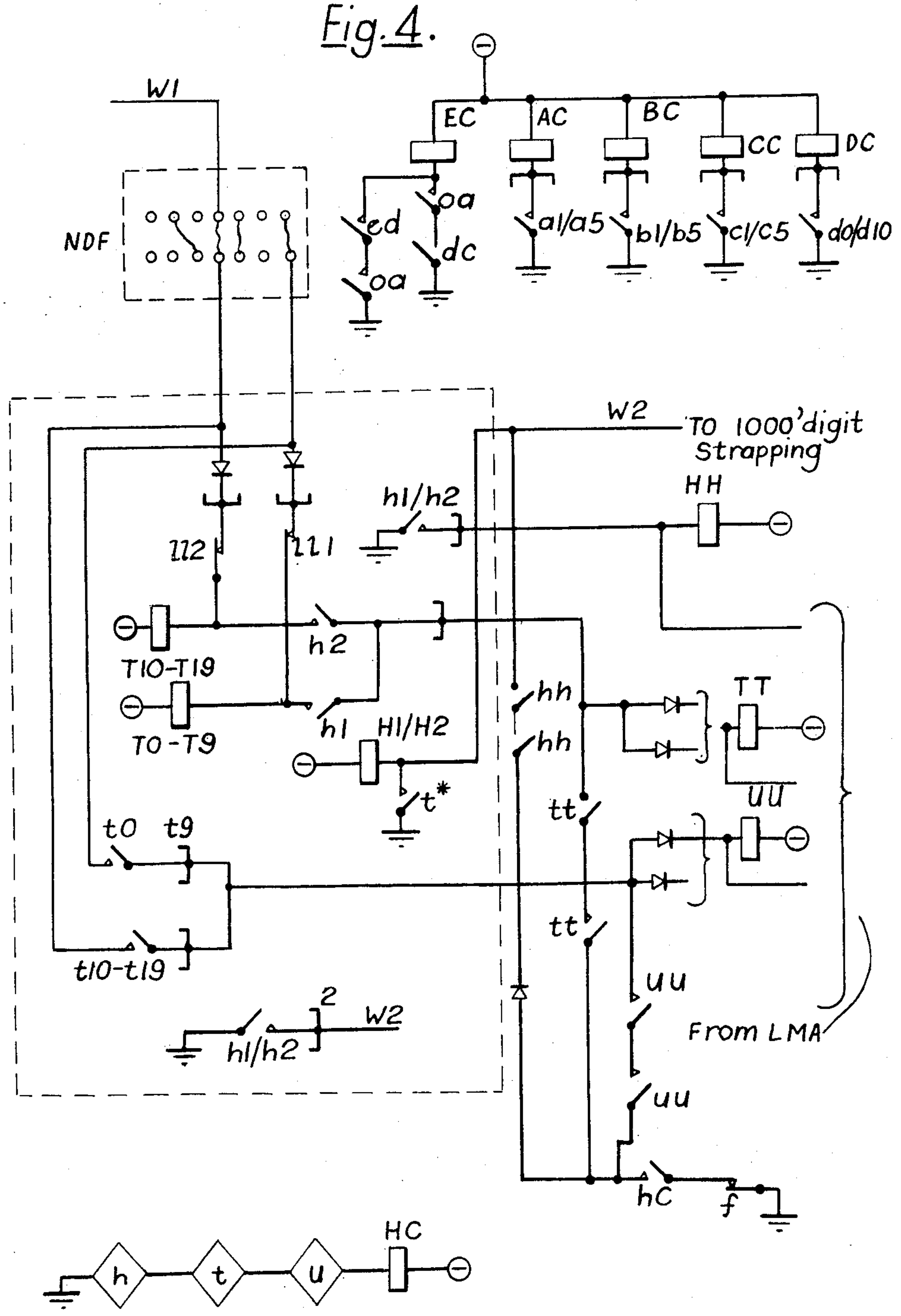

An embodiment of the invention will now be described with reference to the accompanying drawings, in which FIG. 1 is a simplified schematic diagram representing a telephone exchange using a translation arrangement according to the present invention, and FIGS. 2, 3 and 4 show the circuit elements of the translation arrangement.

These three figures should be assembled with FIG. 3 to the left of FIG. 2 and with FIG. 4 to the left of FIG. 3.

The exchange to which the block diagram of FIG. 1 relates is a relatively simple one of the type described in our British Pat. Specification No. 1,101,567 (Ekbergh et al. 12–11). The exchange is assumed to have one "block" of subscribers' lines, served by a switching network 1 formed by two stages of crossbar switches interconnected in "primary-secondary" manner. This network has as its first or subscriber stage 24 switches each of which serves 32 lines, i.e. it serves up to 768 lines. The lines 2 are connected to one side of the network 1, and line links or feed bridges such as 4 are connected to the other side. Control of the network uses registers 5, one of which is seized for each call set up by the system, and one or more markers 6.

The identification and translation facilities to which this invention relates are provided by a "network loop" connected to the marker 6. This loop includes an identification device 7 connected in bi-directional manner to the marker, so that translation from equipment number to directory number or vice versa is possible. This enables wires connected between the marker 6 and the device 7 which relate to equipment numbers to be connected to other wires for the directory numbers. The bi-directional nature of the translations is indicated by the double arrows.

There are more wires available for directory numbers than for equipment numbers, which enables flexibility in numbers in that lines' directory numbers can be changed easily without altering the equipment numbers.

The type of exchange to which FIG. 1 relates has more than one block of lines when the number of lines to be served exceeds 768. Each such block of lines is then served by its own switching network, and the links or feed bridges such as 4 include links used for calls between lines served by the same network and lines served by different switching networks. That is, we have "intra-block" links and "inter-block" links. Further, for each block of lines served by a different switching network such as 1 there is a separate translation arrangement.

The translation arrangement will now be described in some detail with reference to FIGS. 2, 3 and 4, but prior to this description a few comments on the mechanical layout of the equipment is useful, as this explains the groupings used for the various identification relays. As already stated, a full line block has 24 cross-bar switches to which lines are connected, and this can serve up to 32 lines or trunks each. These switches are located in five racks, with five switches in each of four of these racks and the other four switches in the fifth rack.

In order to describe the translation arrangement its operation will be described, first for an originating call, and then for a terminating call.

Originating Call

When a subscriber initiates a call, his line relay L, FIG. 2, is operated in the line loop, and this closes a contact *l*. If the translation arrangement is free, a ground is passed from contact *f* FIG. 2, over a closed contact *p* (only closed if the translation arrangement is free), contact *l*, a closed contact of relay *c* (not shown), a diode and back to the translator via a wire extending into FIG. 3. One of the relays A1–A5, which identify the racks in which the lines' switches, is operated. The "commoning" sign above the broken line, which separates line equipment from the translator, indicates this, there being sets lines commoned in batches of 32 at this point. If there are calls simultaneously present on two or more of the racks, two of these relays will initially operate, but only one holds via a lockout network indicated at LA. Hence the other(s) which fail to receive holding release, to leave only one relay held. The operated A-relay also causes relay AC (FIG. 4) to operate. Thus the operated relay indicates which rack includes the calling line.

The operating earth is also passed via one of 24 wires and over a contact of one of the relays B1–B5: One of these relays operates, in the same manner as did an A-relay, to indicate the identity of the calling line within his switch of the rack. The operated B-relay also operates relay BC (FIG. 4).

The fact that an A-relay and a B-relay have successfully operated causes a ground signal to be sent via contacts *ee*1 or *ee*2 (of EE-relays, not shown), *bc* now closed, an A-relay contact and a B-relay contact to the "line" side of the broken line. Here it operates either relay DD1 or DD2 in the equipment associated with the caller's cross-bar switch. The fact that one of a pair of such relays is operated is a consequence of the nature of the cross-bar switches used, and is not therefore of great significance to this invention.

The ground originally supplied from contact *f* is now extended via contacts *l*, *k* (of a relay K not shown), and a contact of relay DD1 or DD2 to the C- and D-relays in the translation arrangement. These include a set of three relays C1–C3 and eleven relays D0–D10, to give an identification within the 32 lines served by one switch. Initially one of the C-relays operates and completes its own holding circuit, and also operates the relay CC in FIG. 4.

The ground which operated a relay C is extended via a contact of the operated C-relay to one of the D-relays, which latter thereon operates and holds. When a D-relay has operated, relay DC in FIG. 4 operates (which completes another holding circuit for relay DD1 or DD2) followed by relay EC (also in FIG. 4). The combination of an operated C-relay and D-relay identifies the calling line within "his" switch, the rather odd denominations of 3 and 11 again being determined by the nature of the switches used in the exchange.

It will be clear that with different switches and different arrangements of switches within the racks, the numbers of relays in the various groups would differ.

Thus the calling lines equipment number has been determined, and this is sent to the controlling apparatus to enable the latter to connect the caller to a free link with access to a free register. Now it is necessary to determine the caller's directory number since this will in many cases be needed for metering. This determination is initiated by the operation of the E-relays (FIG. 3) in all equipment frames. This occurs via contacts *ec*, and an A-relay contact. Closure of contacts *dc* and *oa* complete a ground path to operate relay EC. The operation of relay EC mentioned earlier occurs once relay DC has operated, which indicates that equipment number identification has been completed and once relay OA has operated (not shown), which indicate that it is an originating call.

A ground is now transferred from a contact *dc*, FIG. 2, via a closed contact of the operated C-relay, a contact of the operated DD-relay, contact *e*, wire W1 to one of the upper set at terminals in a number distribution frame NDF. This frame has a number of wires corresponding to equipment positions connected to the upper set of terminals and a number of wires corresponding to directory numbers connected to the lower set of terminals. These terminals are jumpered together in a manner appropriate to the inter-relation of the equipment numbers and the directory numbers. In the present exchange, each line block includes up to 600 lines and up to 168 trunks, so the upper set of wires are 600 in numbers. The lower set number 800 wires so that the amount of directory numbers available exceeds the amount of equipment numbers. This is administratively useful since it gives freedom of choice in the allocation of directory numbers.

The ground which has thus been extended to the number distribution frame NDF passes from the upper or EN terminal to which it is connected via a jumper (shown as a curly line) to a lower or DN-terminal, from which it passes to a sub-unit TD of the translation arrangement called a terminal discriminator. Each of these TD-units has a capacity of 200 lines or numbers so there are four of them, since the arrangement caters for 800 directory numbers.

At the unit TD the ground is applied via one of two L-relay contacts (the L-relays are not shown) depending on which 100 within those served by the unit includes the line to a "-tens" relay. There are two sets of these, T0–T9 for the lower hundred and T10–T19 for the upper hundred. Assuming that the line has 101 as its last three digits, the ground from NDF passes via contact *lll* to the set of relays for the tens digit. One of them, T0 in this case, operates, followed by a hundreds relay H1 or H2. This occurs via a contact, indicated at *t** of the operated T-relay. In this case it is the hundreds relay H1 which responds to the operated T-relay to close one of the *h*1 contacts to ground. This ground connection completes a path to a set of registering relays HH 0–7, on which the hundreds digit is registered on "two-out-of-five" form. These relays, of which only one is shown, include five relays HH0, HH1, HH2, HH4, HH7, and the two out of five code is as indicated in the table.

| No. | Code | No. | Code |
|---|---|---|---|
| 0 | HH4, HH7 | 5 | HH1, HH4 |
| 1 | HH0, HH1 | 6 | HH2, HH4 |
| 2 | HH0, HH2 | 7 | HH0, HH7 |
| 3 | HH1, HH2 | 8 | HH1, HH7 |
| 4 | HH0, HH4 | 9 | HH2, HH7 |

The operated H-relay also through-connects the operated one of the tens relays to a set of five relays TT, where the tens digit, 0 in this case, is registered on a two-out-of-five basis in the same manner as the hundreds digit.

Finally a contact of the operated tens relay extends ground from NDF to a set of five relays UU to record the units digit, also in two-out-of-five form.

The connection from the unit TD over wire W2, FIG. 4, is used to derive a thousands digit (if needed) via fixed strappings (not shown). Hence the translation arrangement now contains the directory number of the calling line, which is therefore available for use as needed.

At an appropriate time in the call setting operation, i.e. when the DN and EN have been fully transferred to the equipments which need them, the translation arrangements' relays are released in known manner so that they can be used for another call.

Terminating Call

Now the operations which occur on a terminating call will be described.

In the case of a terminating call, the called subscriber's directory number DN is dialled or otherwise sent to the register (e.g. register 5, FIG. 1). When the latter "realises" from the digits which it has received that the call is to be terminated locally it seizes for use an intermediate circuit (not shown) to which it transfers the wanted lines digits. As already mentioned, the register and the other controlling equipment needs the line's equipment number EN so that it can extend the connection thereto. Then the translation circuitry is seized and the relay sets HH–TT–UU (FIG. 4) are operated via the connections bracketed together with the legend "from LMA". The equipment LMA (not shown) is the above-mentioned intermediate circuit. As before, the last three digits are stored in two-out-of-five form in the above-mentioned relays.

At this point it should be mentioned that on all occasions on which these relay sets are operated, the accuracy of the parity is checked by well-known circuits for checking for each digit that neither more than nor less than two relays have operated. These circuits are represented schematically in FIG. 4 by the diamonds *h*, *t* and *u* connected in series to relay HC, which only operates if the parity is correct for these three digits.

With relay HC operated after the last three digits of the wanted number have been registered in HH–TT–UU, ground is extended via contacts *f*, *hc* and contacts of the operated HH-, TT- and UU-relays to the unit TD. Here in each TD-unit one H-relay is operated, followed by a T-relay, the T-relay being that one of 20 which is appropriate to the operated H-relay and the line's tens digit. The ground is thus sent from TD via a contact of the appropriate one of these 20 relays to the wire to the frame NDF which is appropriate to the wanted line's directory number.

Thus NDF receives a ground on one of its lower set of terminals, which ground is extended via a jumper to the equipment number terminal for the wanted line. This ground is further extended via wire W1 to FIG. 2 and therein via contacts of relays L and K to the relay sets in FIG. 3. Here relay sets, A, B, C and D respond in sequence to register the line's equipment number in exactly the same way as was done when this number was registered in response to call initiation.

If either or both of the relays L or K is operated, which means respectively that the wanted line is busy or is in lockout condition, there is no equipment number identification. This condition is interpreted by the equipment as busy.

When the directory number is that for the PBX subscriber, the DN-tag in the frame NDF is strapped to two or more of the EN-portion tags and the relays which operate in the case of a terminating call convey the number of one free line of that group.

Thus as a result of the operations described, the translation arrangement has stored both the wanted line's DN and EN, which numbers are entitled to such control apparatus as needs them, whereafter the translation arrangement is released.

Although in the arrangements described above, the operations are based on the use of electro-magnetic relays, it will be apparent that the electronic equivalents thereof can also be used. Where the exchange's control apparatus is of an electronic nature, as is the case in certain modern exchanges using sealed-contact reed relays in the speech path, such use of electronics for translation may be essential in the interest of compatibility with other control apparatus. If electronics is used, then integrated circuitry would be especially suitable.

It is to be understood that the foregoing description of specific examples of this invention is not to be considered as a limitation of its scope.

We claim:

1. In a telephone exchange, a bi-directional registration and translation network comprising: a first plural digit register responsive to the initiation of a call from a line in said exchange for marking a lead of a first plurality of leads to register an indication representative of the equipment location number of said calling line, signalling means responsive to the completion of a registration of the full calling line equipment location number for initiating registration of the multi-digit directory number representative of a calling line, a second plural digit register responsive to said initiating signal from said signalling means for effecting the serial translation of the equipment location number representative of said calling line to the directory number representative of said calling line and for storing said translated number, means for accessing the second register to indicate the directory number representative of a called line for registration thereof and mark a representative one of a second plurality of leads, and means responsive to the completion of said last mentioned registration for initiating the serial translation of said registration on said first register indicative of the equipment location number of said called line, whereby to mark the representative one of said first plurality of leads.

2. A network according to claim 1, in which the leads of said second plurality intended for the subscriber directory numbers are more numerous than the leads of said first plurality for the subscriber equipment numbers, whereby necessary alternations of subscriber directory numbers are enabled by connecting the corresponding leads for equipment numbers to non-occupied leads for subscriber directory numbers.

3. A network as claimed in claim 1, in which said first and second plural digit registers each comprise groups of electromechanical relays, each group representing a digit of a number, and in which the relays forming said first register are so arranged that, when initiating call conditions are simultaneously received from two or more lines, a combination of relays in one of said registers identifies which ones of said lines are calling, which identification also performs the selection of which one of said calling lines is to be accorded access to said one register.

4. A network as claimed in claim 3, wherein said last mentioned initiating means comprises a parity check means serially operated through relays representative of each digit of said directory number representative of the called line.

* * * * *